(12) United States Patent
Wang

(10) Patent No.: US 7,637,772 B2
(45) Date of Patent: Dec. 29, 2009

(54) WALL PLATE ASSEMBLY

(75) Inventor: Chang-Pin Wang, Taipei (TW)

(73) Assignee: Sure-Fire Electrical Corporation, Taipei Hsien (TW)

( * ) Notice: Subject to any disclaimer, the term of this patent is extended or adjusted under 35 U.S.C. 154(b) by 278 days.

(21) Appl. No.: 11/874,935

(22) Filed: Oct. 19, 2007

(65) Prior Publication Data

US 2009/0103271 A1  Apr. 23, 2009

(51) Int. Cl.
  *H01R 13/60* (2006.01)
(52) U.S. Cl. ...................................... 439/536
(58) Field of Classification Search ................ 439/535, 439/536, 577, 527; 361/728
  See application file for complete search history.

(56) References Cited

U.S. PATENT DOCUMENTS

| | | | | |
|---|---|---|---|---|
| 5,599,190 A * | 2/1997 | Willette | ........................ | 439/49 |
| 6,420,964 B1 * | 7/2002 | Nishikawa et al. | .......... | 375/257 |
| 6,543,940 B2 * | 4/2003 | Chu | ............................ | 385/53 |
| 7,374,454 B1 * | 5/2008 | Wang | ......................... | 439/536 |
| 7,540,768 B1 * | 6/2009 | Wang | ......................... | 439/536 |
| 7,549,894 B1 * | 6/2009 | Wang | ......................... | 439/577 |
| 7,559,795 B2 * | 7/2009 | Byrne | ........................ | 439/536 |
| 7,563,131 B2 * | 7/2009 | Sullivan et al. | ............. | 439/535 |
| 2002/0142650 A1 * | 10/2002 | Clark et al. | ................. | 439/536 |
| 2003/0048895 A1 * | 3/2003 | Kiko et al. | ............. | 379/390.02 |
| 2007/0037442 A1 * | 2/2007 | Sullivan et al. | ............. | 439/535 |
| 2009/0047827 A1 * | 2/2009 | Liao | ........................... | 439/501 |
| 2009/0156054 A1 * | 6/2009 | Wang | ......................... | 439/527 |

* cited by examiner

*Primary Examiner*—Alexander Gilman

(57) ABSTRACT

A wall plate assembly includes a wall plate with an insertion slot for the installation of a HDMI (High-Definition Multimedia Interface) connector of a HDMI cable and a power plug hole for the insertion of a power plug, a signal amplifier connected to the back side of the wall plate for receiving the installed HDMI connector and amplifying the signal, a support device, which comprises a first support frame vertically adjustably fastened to the wall plate below the insertion slot and a second support frame horizontally adjustably fastened to the first support frame for holding down the installed HDMI connector on the first support frame, and a power connector aimed at the power plug hole for receiving a power plug to provide the signal amplifier with the necessary working voltage.

7 Claims, 14 Drawing Sheets

WALL PLATE ASSEMBLY

BACKGROUND OF THE INVENTION

1. Field of the Invention

The present invention relates to a wall plate structure for receiving a HDMI (High-Definition Multimedia Interface) connector and more particularly, to a wall plate assembly that has a support device adjustable to hold down the installed HDMI connector, a signal amplifier to enhance signal strength, and a power connector for receiving a power plug to provide with signal amplifier with the necessary working voltage.

2. Description of the Related Art

Following fast development of high technology, advanced and sophisticated consumer electronic products are continuously created and put into market. In a house, many electric cables and connection devices may be arranged on the ceiling, wall or floor for the installation of electronic products. Arranging electric cables and connection devices on the outside of the ceiling, wall or floor destructs the sense of beauty of the house. Further, it is not safe to have electric cables and connection devices been exposed to the outside. In a modern building, electric cables and connection devices are embedded in the ceiling, wall or floor, and wall plates are provided on the outside of the ceiling, wall or floor for the installation of an electronic product.

In recent years, there is a great change in audio and video application. Nowadays, video disks, digital multifunction disks, high definition digital TVs, video phones and video conference products are commonly seen in our daily life. When compared to conventional techniques, the architecture of these new systems shows the characteristic of the use of digital technique to process audio and video data. Following the need for application in different fields, different standards are established and continuously modified for better performance. Nowadays, VGA and component video are being replaced by HDMI and DVI. These two digital video standards have nearly identical requirements, and must handle a set of high-frequency and low-frequency signals simultaneously. The DVI specification and the HDMI specification use TMDS (Transition Minimized Differential Signaling) for the high-frequency (video) portion of the data. The TMDS signal carries R,G,B and clock through four differential pairs, which occupy 8 pins of a 19-pin connector. Both HDMI and DVI are designed to be "plug and play" where the monitor and the source link up and find a way to function together at optimal performance. HDMI is an all-digital audio/video interface capable of transmitting uncompressed streams. HDMI provides an interface between any compatible digital audio/video source, such as a set-top box, a DVD player, or the like and a compatible digital audio and/or video monitor, such as digital television. HDMI supports many digital video formats and digital audio formats. HDMI is capable of transmitting 8-channel compressed or non-compressed digital audio signals at a time, eliminating an extra sound source cable and simplifying wiring arrangement. HDMI transmission speed can be as high as 5 Gbps. When comparing to DVI's 8-bit color depth, HDMI provides 10-bit~12-bit color depth for every prime color. Further, a HDMI connector has a size about equal to a USB connector that is much smaller than a DVI connector. In the computer world, HDMI is already found on many peripherals and a few newer video cards, with adoption rapidly increasing. However, if a high frequency transmission line is connected to multiple users through a router and the receiver is spaced from the transmitter at a long distance, the strength of the signal being transmitted through the transmission line will be attenuated, causing video signal distortion or interruption. Therefore, the application of a high frequency transmission line is limited. Further, when a cable is used for the transmission of a high frequency signal to a digital TV, a signal amplifier may be used and installed in the transmitting side or receiving side to enhance the signal strength of the signal. However, conventional signal amplifiers for this purpose are still not satisfactory in function because of the following drawbacks:

1. If the location of the signal amplifier is far from the power source and the signal amplifer cannot obtain an external power supply, the signal amplifer may be unable to function well due to power low.

2. If the location of the signal amplifier is far from the signal transmitting side or signal receiving side, the effective length of the transmission line is limited, and the problem signal attenuation, signal interruption or signal instability may occur.

3. During signal transmission, the signal amplifier, the signal amplifer gives no indication. In case of signal instability during transmission due to a failure of the signal amplifier, the user or mechanic cannot quickly find out the problem, and much time will be wasted before the problem of the signal amplifier is checked.

SUMMARY OF THE INVENTION

The present invention has been accomplished under the circumstances in view.

According to one aspect of the present invention, the wall plate assembly comprises a wall plate with an insertion slot and a power plug hole, a support device fastened to the wall plate to support an electric connector that is inserted into the insertion slot, a signal amplifier mounted on the back side of the wall plate and adapted to receive the electric connector that is supported on the support device and inserted into the insertion slot and to amplify the signal transmitting through the connected electric connector, and a power connector aimed at the power plug hole for receiving a power plug to provide the signal amplifier with the necessary working voltage.

According to another aspect of the present invention, the signal amplifier comprises a connection interface, which is used for receiving a HDMI (High-Definition Multimedia Interface) connector of a HDMI (High-Definition Multimedia Interface) cable, a circuit board for enhancing the signal strength of the signal transmitting through the HDMI connector that is connected to the connection interface, and an adapter interface for output of the signal strength-enhanced signal.

DETAILED DESCRIPTION OF THE PREFERRED EMBODIMENT

Figure 1:
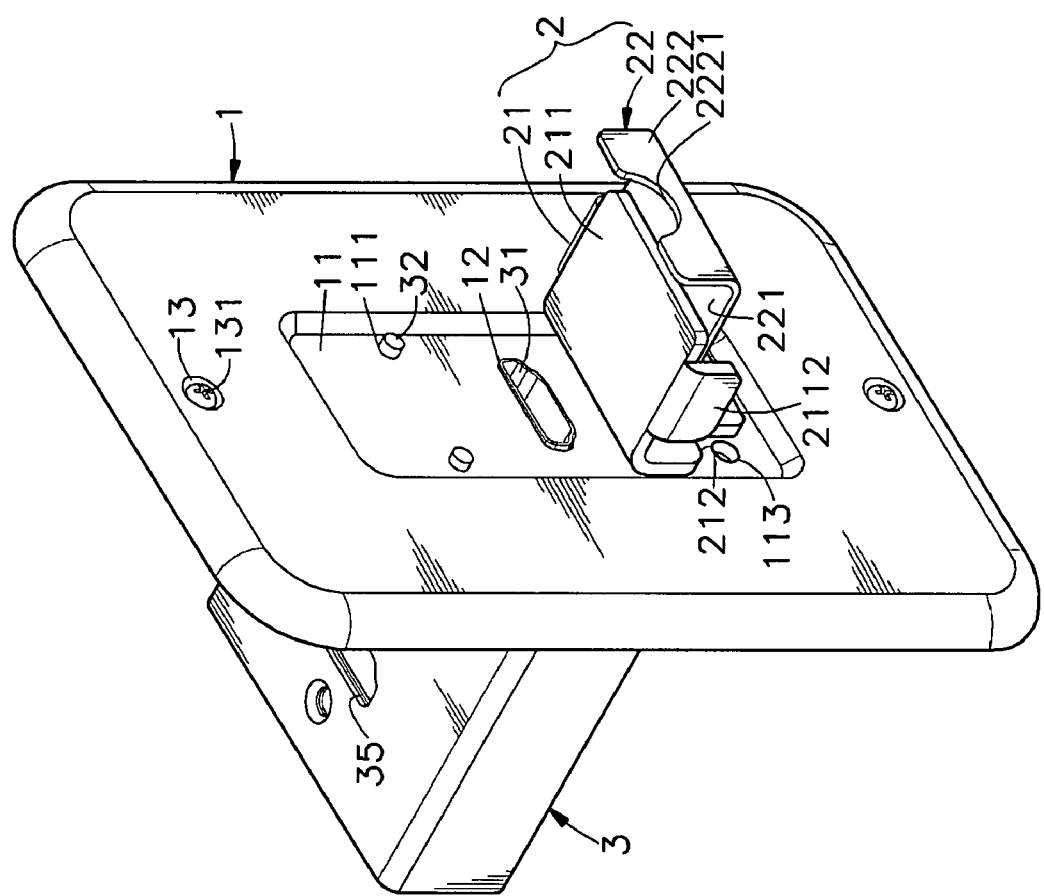
FIG. 1 is an oblique elevation of a wall plate assembly in accordance with the present invention.
Figure 2:
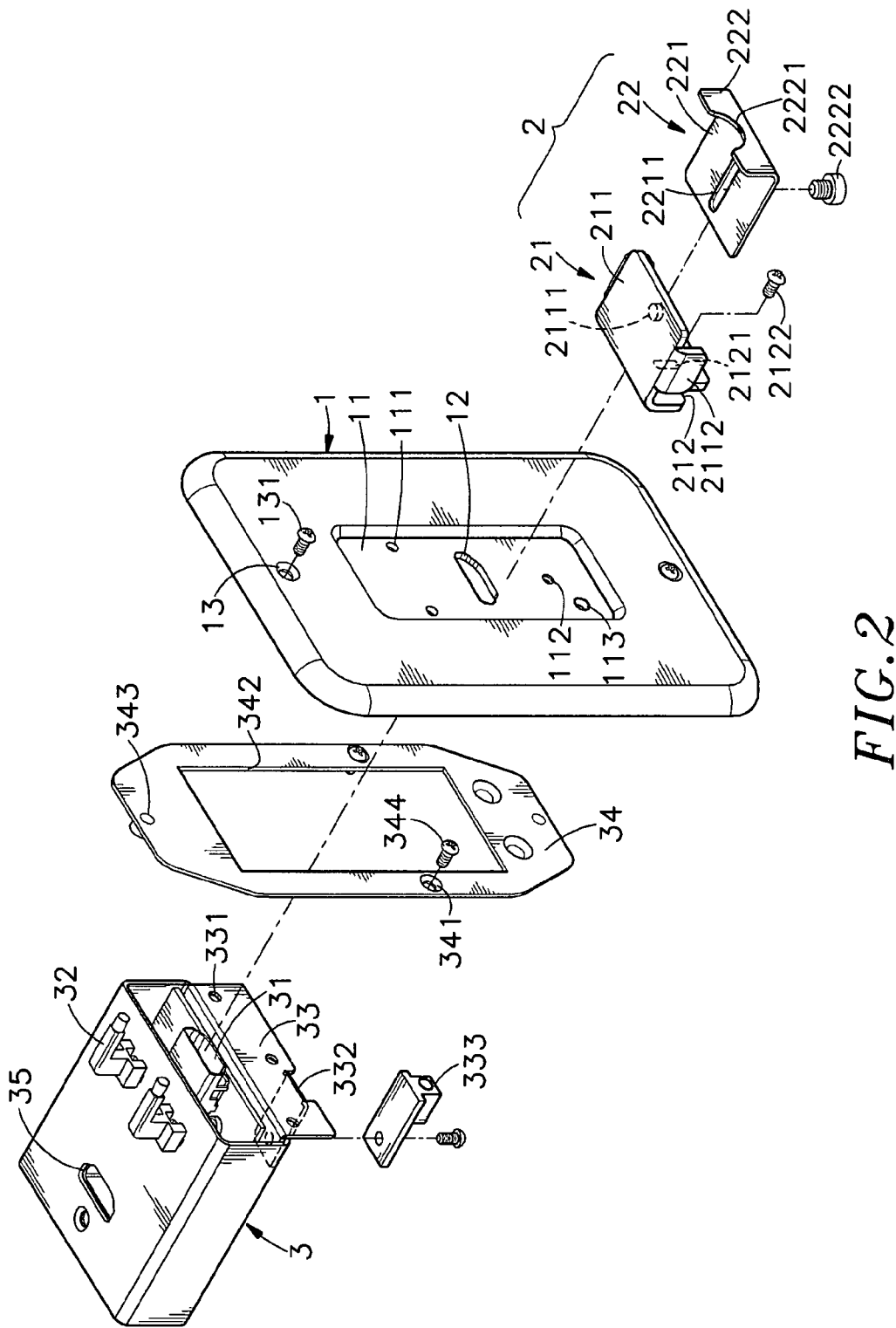
FIG. 2 is an exploded view of the wall plate assembly in accordance with the present invention.
Figure 3:
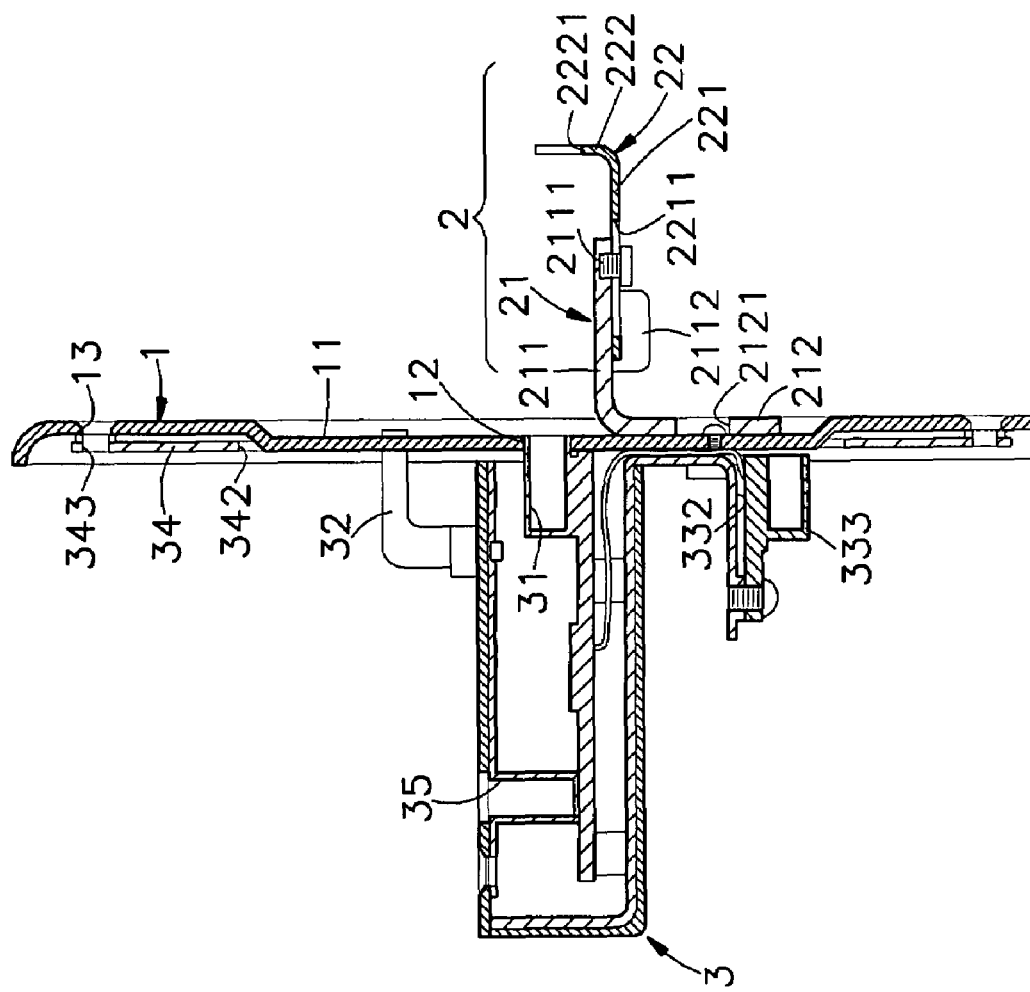
FIG. 3 is a sectional side view of the wall plate assembly according to the present invention.

Referring to FIGS. 1~3, a wall plate assembly for electric connector in accordance with the present invention is shown comprised of a wall plate 1, a support device 2, a signal amplifier 3 and a power connector 333.

The wall plate 1 has a front recess 11 on it front side, an insertion slot 12 cut through the front recess 11 on the middle, a plurality of through holes 111, a screw hole 112 and a power plug hole 113 cut through the front recess 11 at selected locations, and a plurality of mounting holes 13 cut through the front and back sides beyond the front recess 11 and respectively provided with a respective fastening member, for example, screw 131 for fastening to the wall.

The support device 2 is comprised of a first support frame 21 and a second support frame 22. The first support frame 21 and the second support frame 22 are movable relative to each other. The first support frame 21 has a horizontal panel 211 and a vertical panel 212 connected at right angles. The horizontal panel 211 has a bottom screw hole 2111, and two downwardly extending side wings 2112. The vertical panel 212 has a vertical sliding slot 2121. The second support frame 22 is coupled to the bottom side of the horizontal panel 211 of the first support frame 21, having a flat horizontal base 221 and an upright wall 222 vertically extending from one side of the flat horizontal base 221. The flat horizontal base 221 has an elongated sliding slot 2221 cut through the top and bottom sides and extending in direction perpendicular to the upright wall 222. The upright wall 222 has an arched top notch 2221. The flat horizontal base 221 of the second support frame 22 is attached to the bottom side of the horizontal panel 211 of the first support frame 21 between the two side wings 2112, and then a screw 2222 is inserted through the elongated sliding slot 2221 and threaded into the bottom screw hole 2111 to lock the second support frame 22 to the first support frame 21. When loosened the screw 2222, a user can move the second support frame 22 relative to the first support frame 21 to adjust the horizontal width of the support device 2.

The signal amplifier 3 has a connection interface 31 at its one side, at least one indicator light 32 disposed on the outside of the connection interface 31, a locating frame 33 downwardly extending from the front side of the connection interface 31, a plurality of locating holes 331 and a mounting groove 332 formed on the locating frame 33, a mounting plate 34 for fastening the locating frame 33 to the wall plate 1, and an adapter interface 35 formed in the outside wall and electrically connected to the connection interface 31. The mounting plate 34 has a rectangular opening 342 which receives a back protruding part of the wall plate 1 corresponding to the front recess 11, two locating holes 341 disposed at two opposite lateral sides relative to the rectangular opening 342 and respectively fastened to one respective locating hole 331 of the locating frame 33 with a respective fastening member, for example, screw 344, and a plurality of mounting through holes 343 corresponding to the mounting holes 13 of the wall plate 1 for the passing of the screws 131.

The power connector 333 is affixed to the mounting groove 332 of the locating frame 33 and electrically connected to the signal amplifier 3.

During installation, the support device 2 is set in the front recess 11 of the wall plate 1, and a screw 2122 is inserted through the vertical sliding slot 2121 and threaded into the screw hole 112 to lock the first support frame 21 to the wall plate 1 at the desired elevation. Further, the power connector 333 is affixed to the mounting groove 332 of the locating frame 33 and electrically connected to the signal amplifier 3, and the mounting through holes 343 of the mounting plate 34 are respectively connected to the mounting holes 13 of the wall plate 13 by the respective screws 131. When installed, the indicator lights 32 of the signal amplifier 3 are respectively inserted into the through holes 111 of the wall plate 1, the connection interface 31 is aimed at the insertion slot 12 of the wall plate 1, and the power connector 333 is set in alignment with the power plug hole 113.

Figure 4:
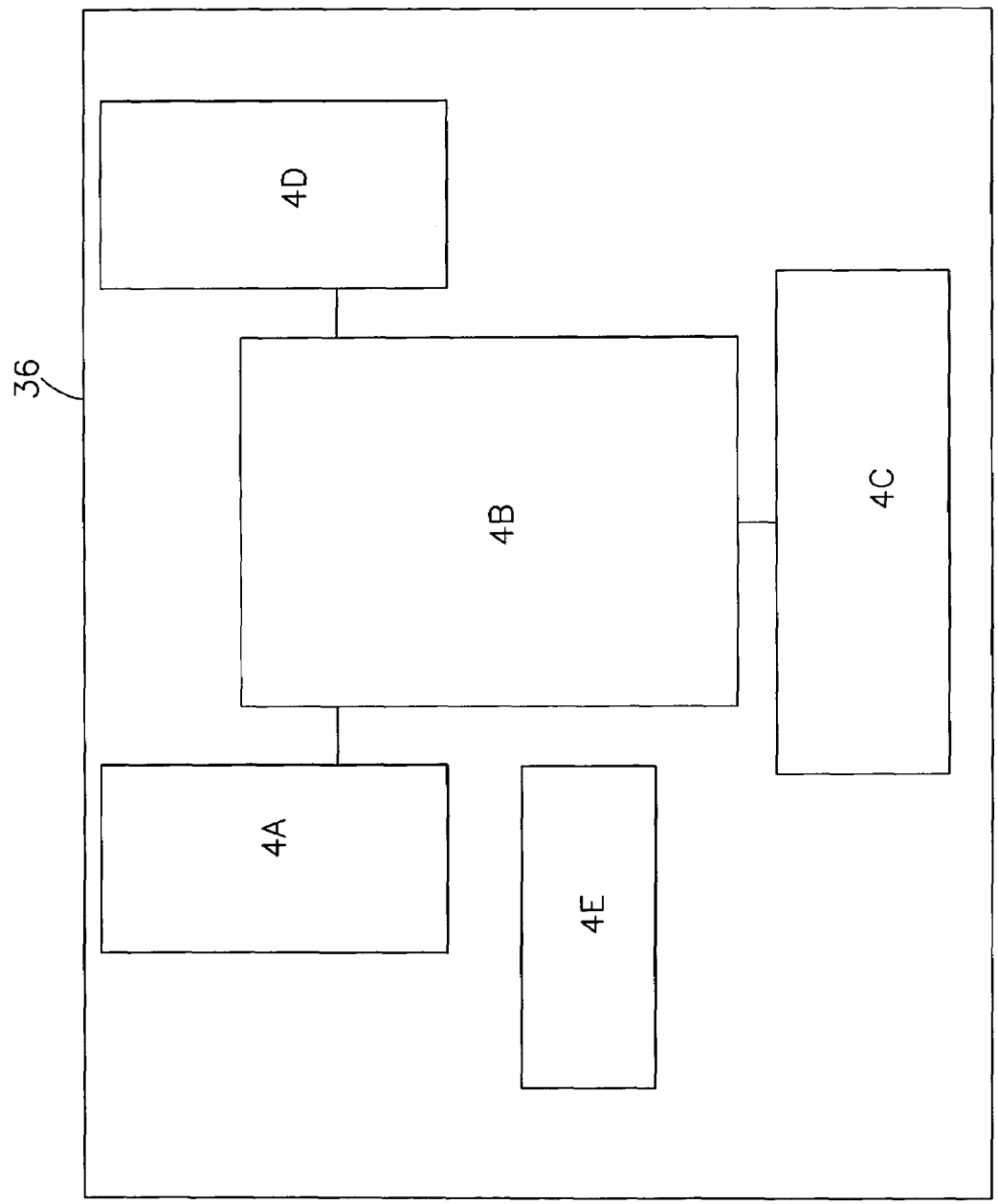
FIG. 4 is a diagram of a circuit according to the present invention, showing how FIGS. 4A, 4B, 4C, 4D and 4E mate together.
Figure 4A:
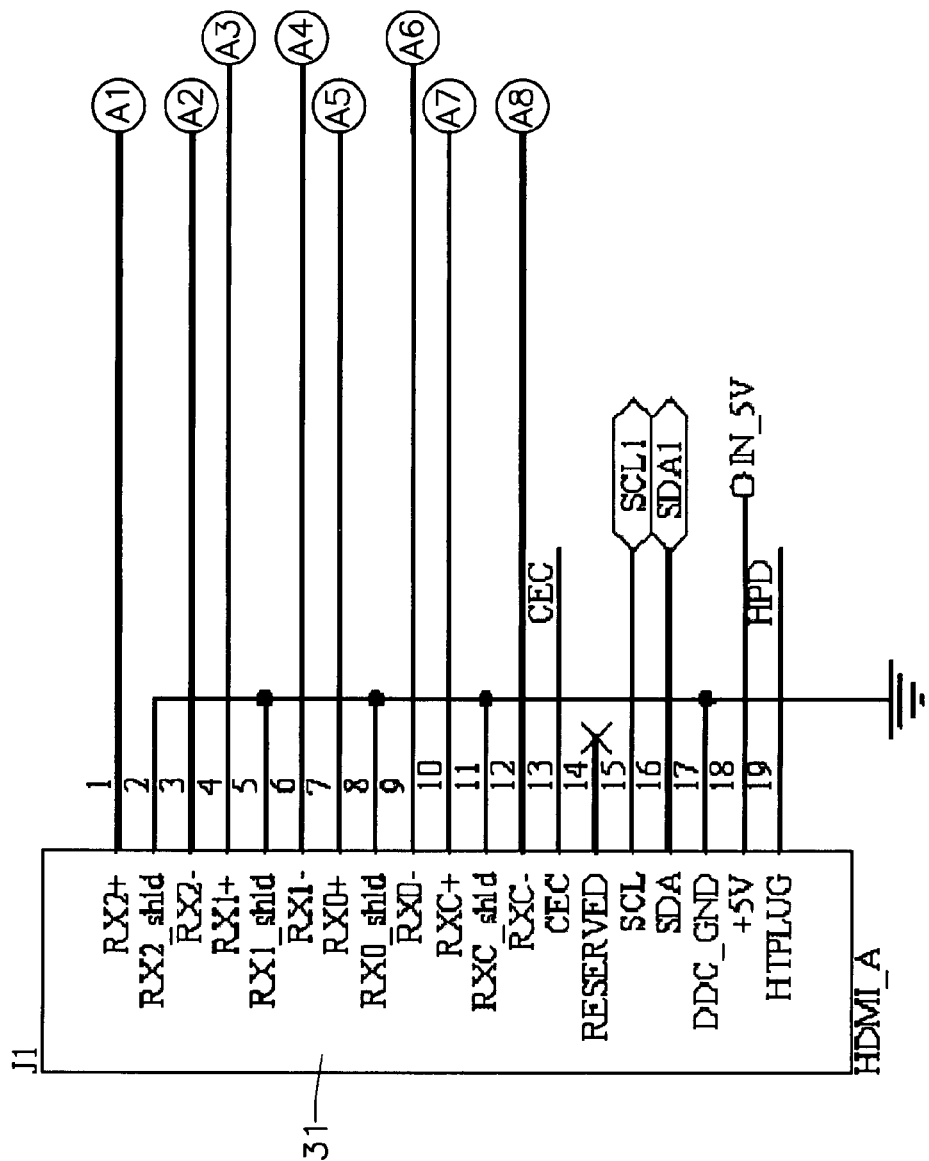
FIGS 4A, 4B, 4C, 4D and 4E together form FIG. 4.
Figure 4B:
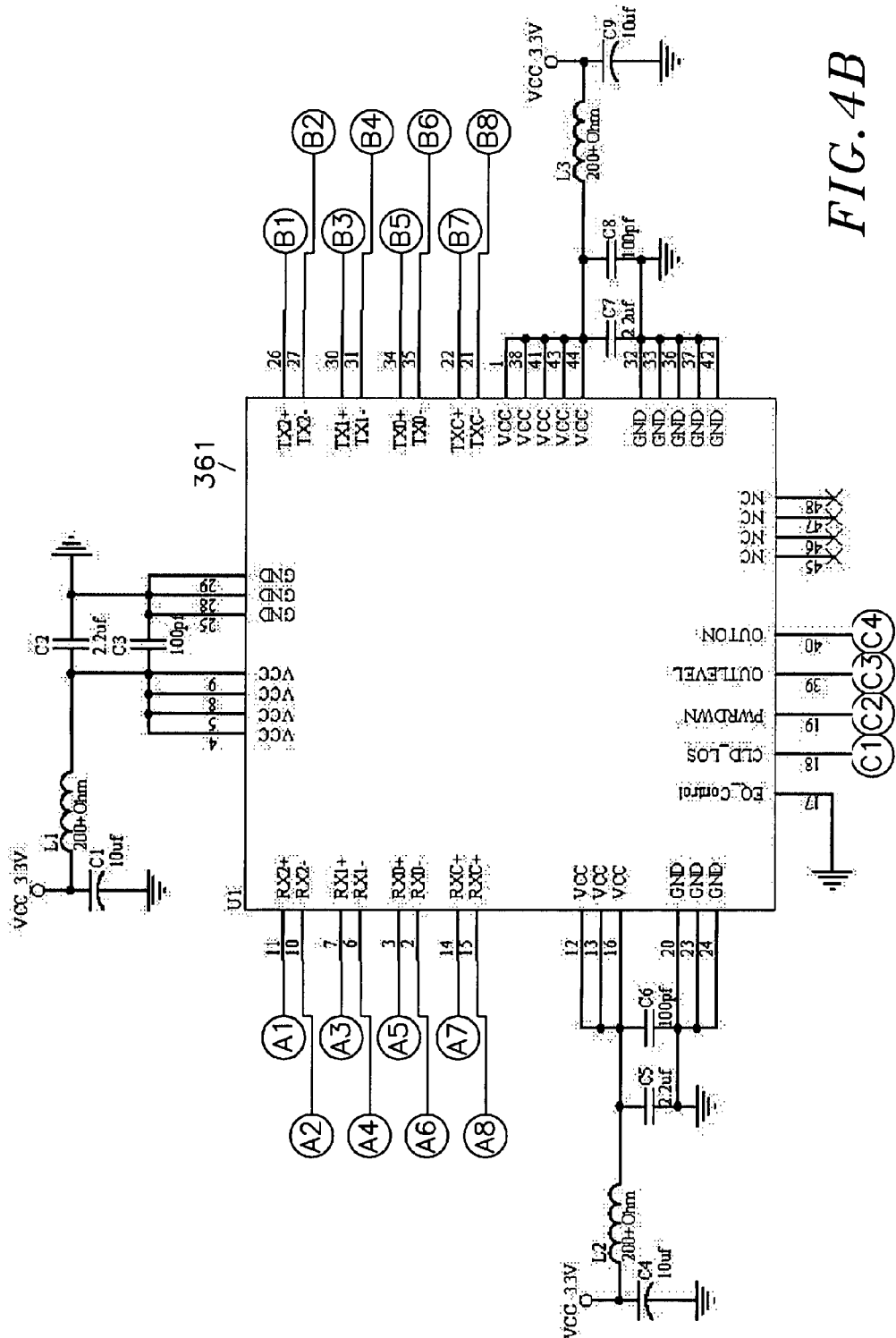
Figure 4C:
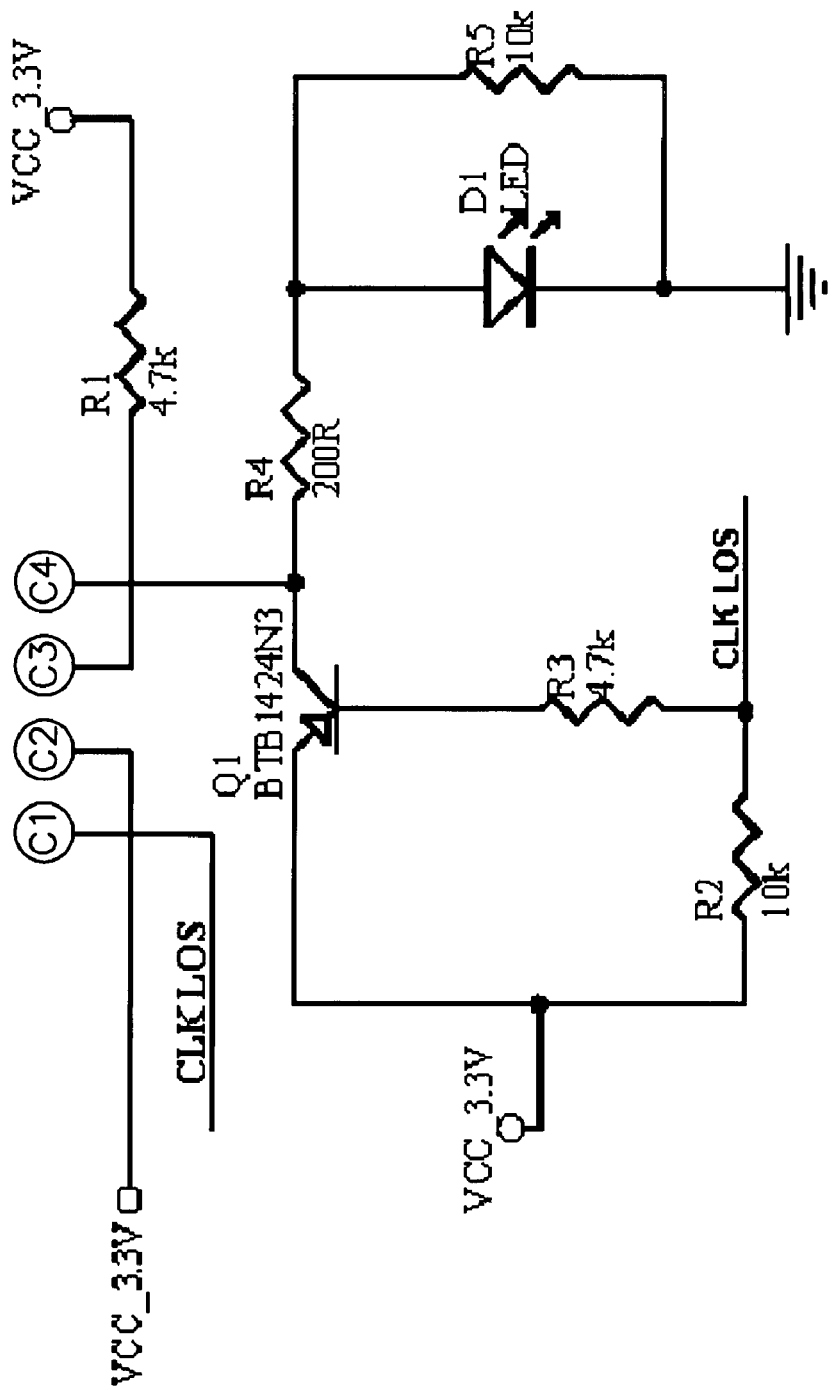
Figure 4D:
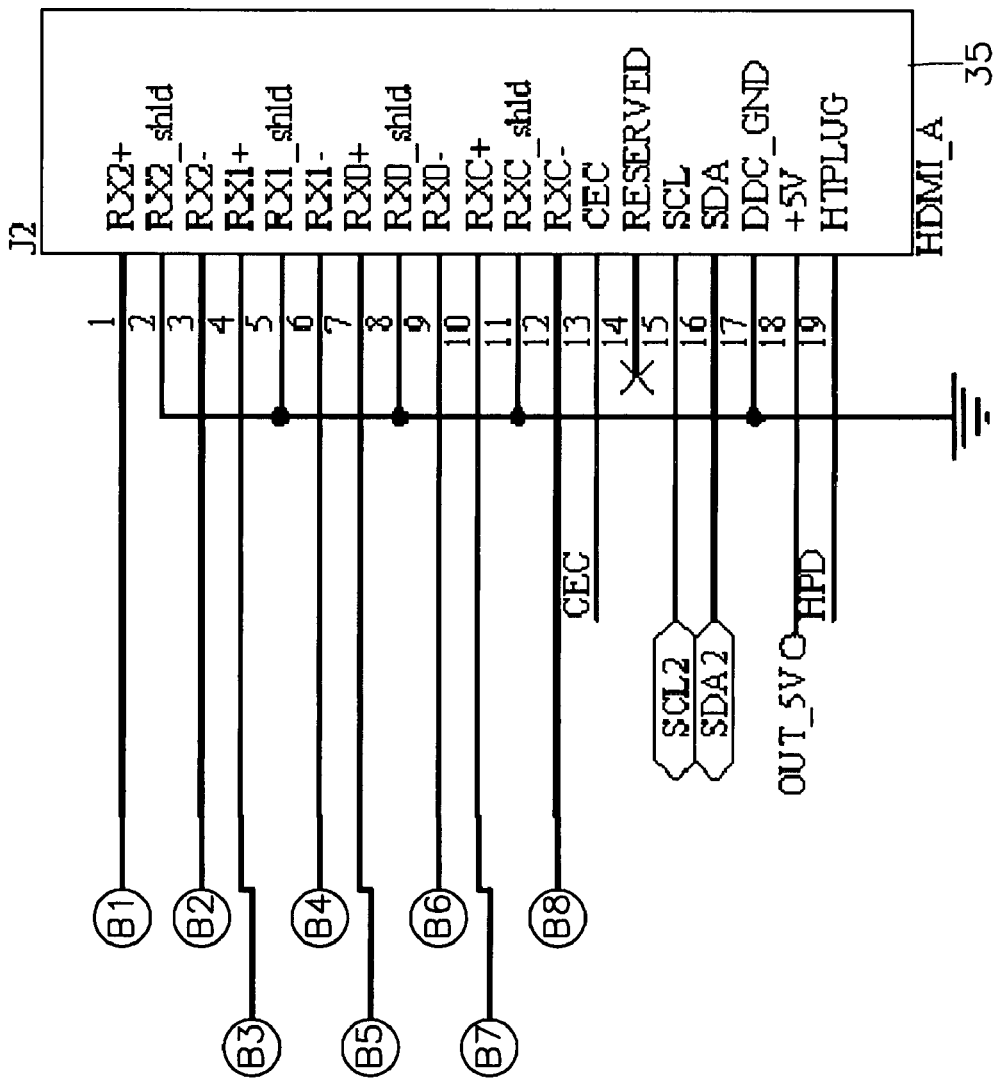
Figure 4E:
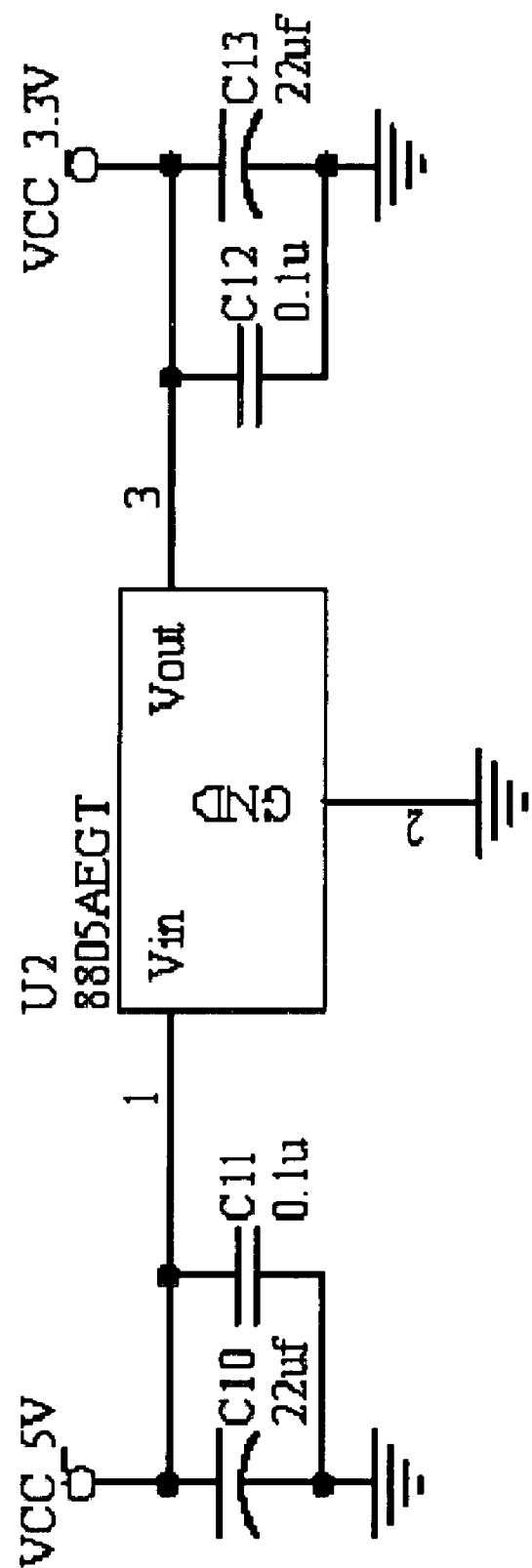
Figure 5:
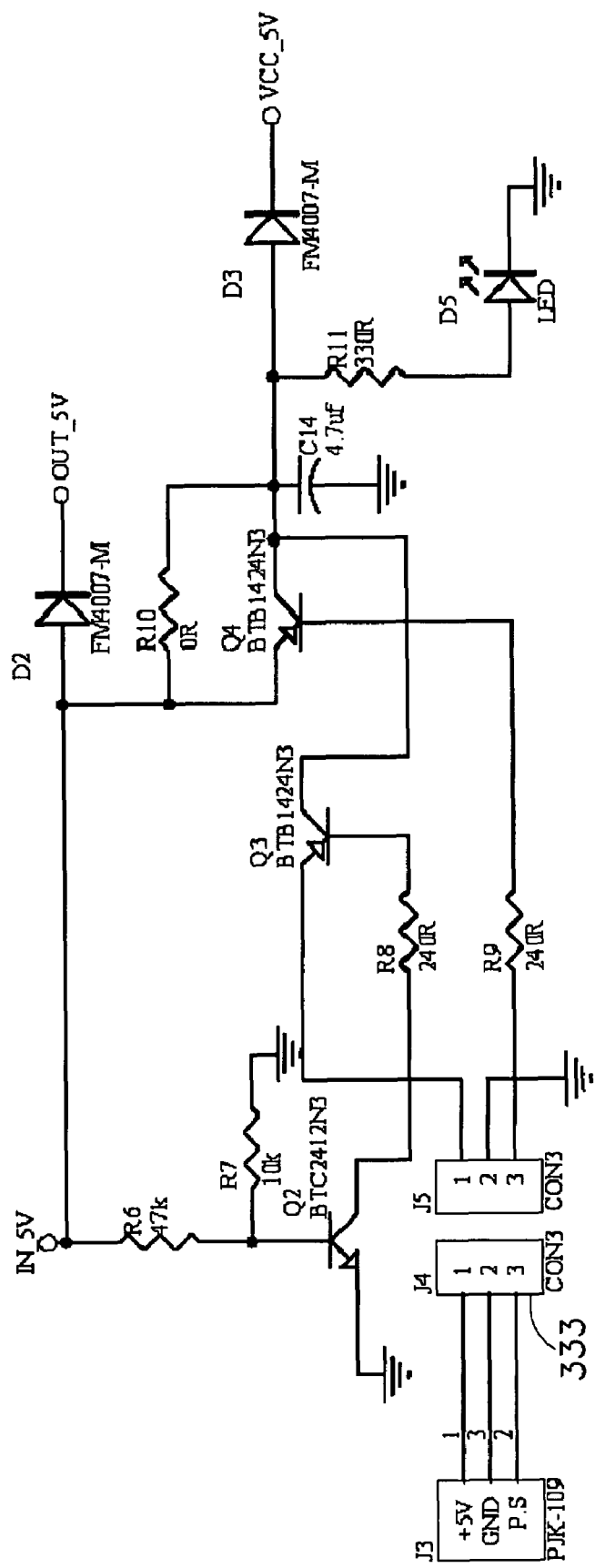
FIG. 5 is a circuit diagram of the power supply of the present invention.

Referring to FIGS. 4~5 and FIG. 3 again, the signal amplifier 3 comprises a circuit board 36 that is disposed on the inside. The circuit board 36 comprises a signal amplification chip 361. When the connection interface 31 of the signal amplifier 3 receives an external signal, the signal amplification chip 361 enhances the signal strength for output through the adapter interface 35, eliminating the problem of signal attenuation during transmission. In case of power low during signal processing operation of the circuit board 36, external power supply can be supplied to the power connector 333 and then transmitted by the power connector 333 to the circuit board 36 of the signal amplifier 3. Therefore, sufficient power supply is provided during signal transmission through the connection interface 31 and the adapter interface 35.

Figure 6:
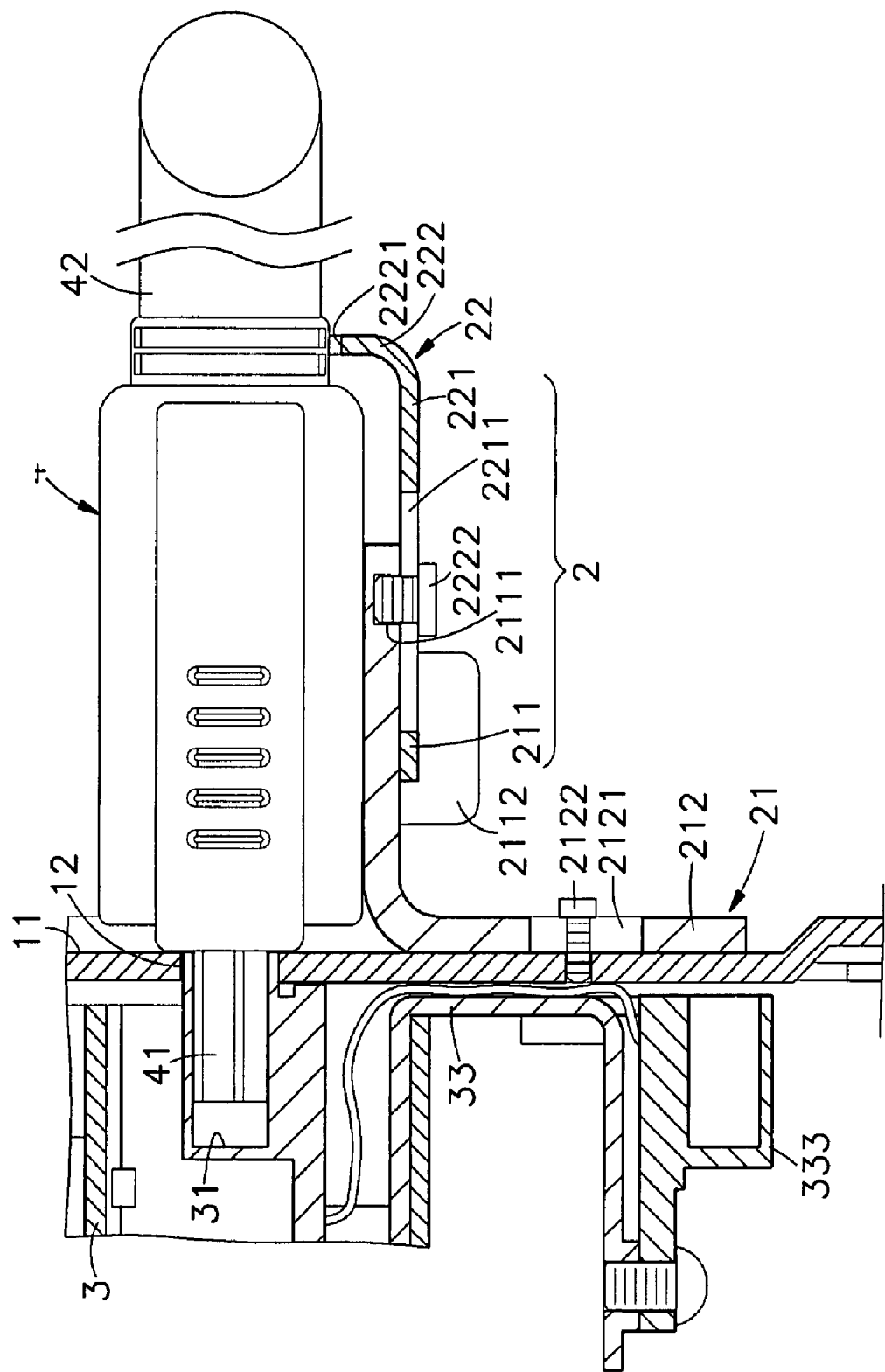
FIG. 6 is a sectional side view of the present invention, showing a HDMI connector inserted into the insertion slot of the signal amplifier.
Figure 7:
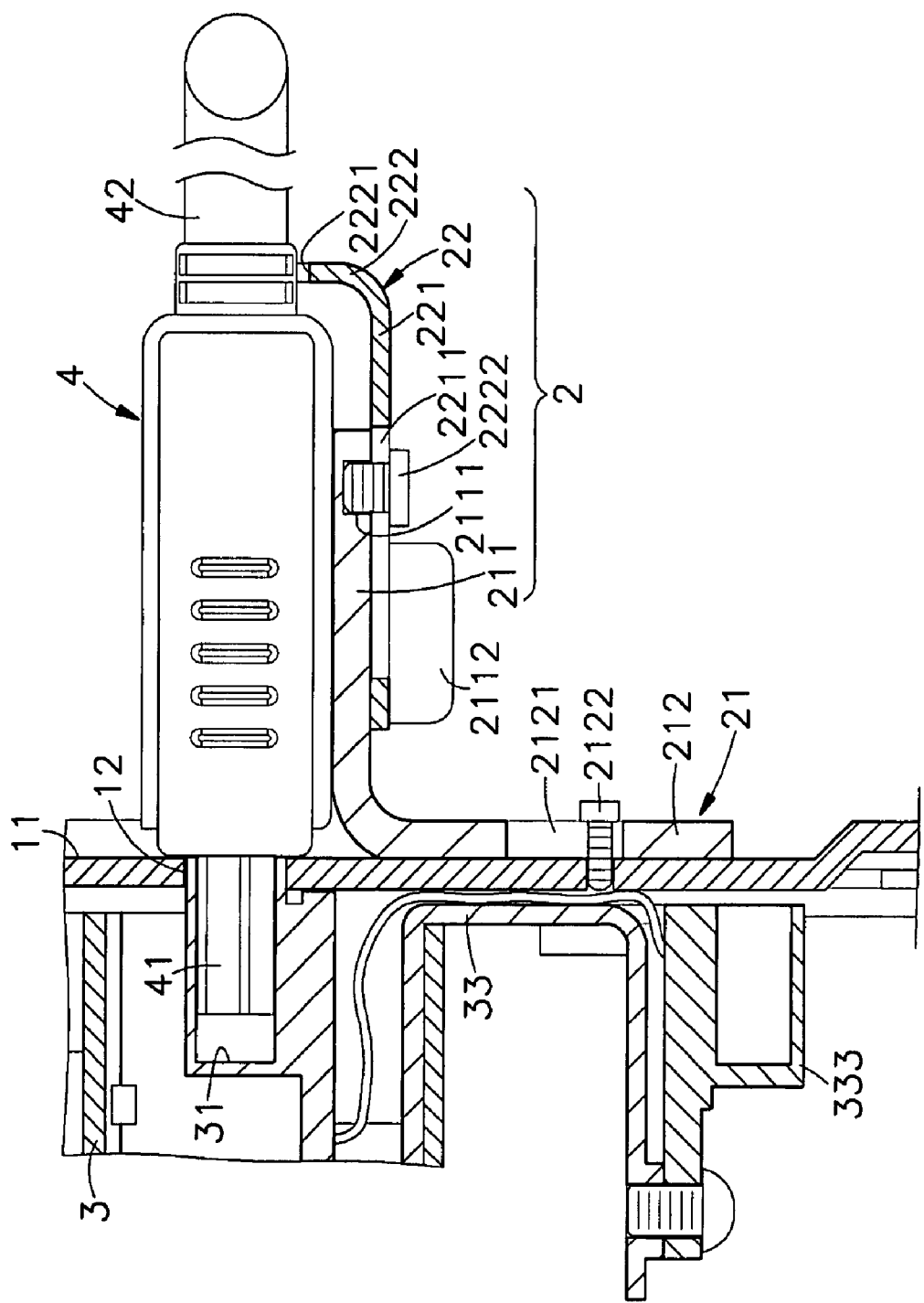
FIG. 7 corresponds to FIG. 6, showing the support device adjusted subject to the size of the HDMI connector.

Referring to FIGS. 6 and 7, the wall plate assembly is adapted to receive an electric connector 4 at one end of a cable 42. The electric connector 4 is a HDMI (High-Definition Multimedia Interface) connector, having a connection portion 41 at its front side. During installation, the electric connector (HDMI connector) 4 is supported on the horizontal panel 211 of the first support frame 21 with the connection portion 41 inserted through the insertion slot 12 of the wall plate 1 into the connection interface 31 of the signal amplifier 3 and the cable 42 positioned in the arched top notch 2221 of the upright wall 222 of the second support frame 22 of the support device 2. After installation, the cable 42 and the electric connector (HDMI connector) 4 transmit 720p/1080i image signal through the connection portion 41. When a different size of electric connector (HDMI connector) 4 is used, the screw 2122 can be loosened for allowing adjustment of the elevation of the first support frame 21 relative to the wall plate 1 to let the connection portion 41 of the electric connector (HDMI connector) 4 be inserted through the insertion slot 12 of the wall plate 1 into the connection interface 31 of the signal amplifier 3, and the screw 2222 can be loosened for allowing adjustment of the second support frame 22 relative to the first support frame 21 to have the electric connector (HDMI connector) 4 be positively supported on the horizontal panel 211 of the first support frame 21 and stopped between the wall plate 1 and the upright wall 222 of the second support frame 22. After adjustment, the screws 2122 and 2222 are respectively fastened tight to lock the first support frame 21 to the wall plate 1 and the second support frame 22 to the first support frame 21 respectively.

Figure 8:
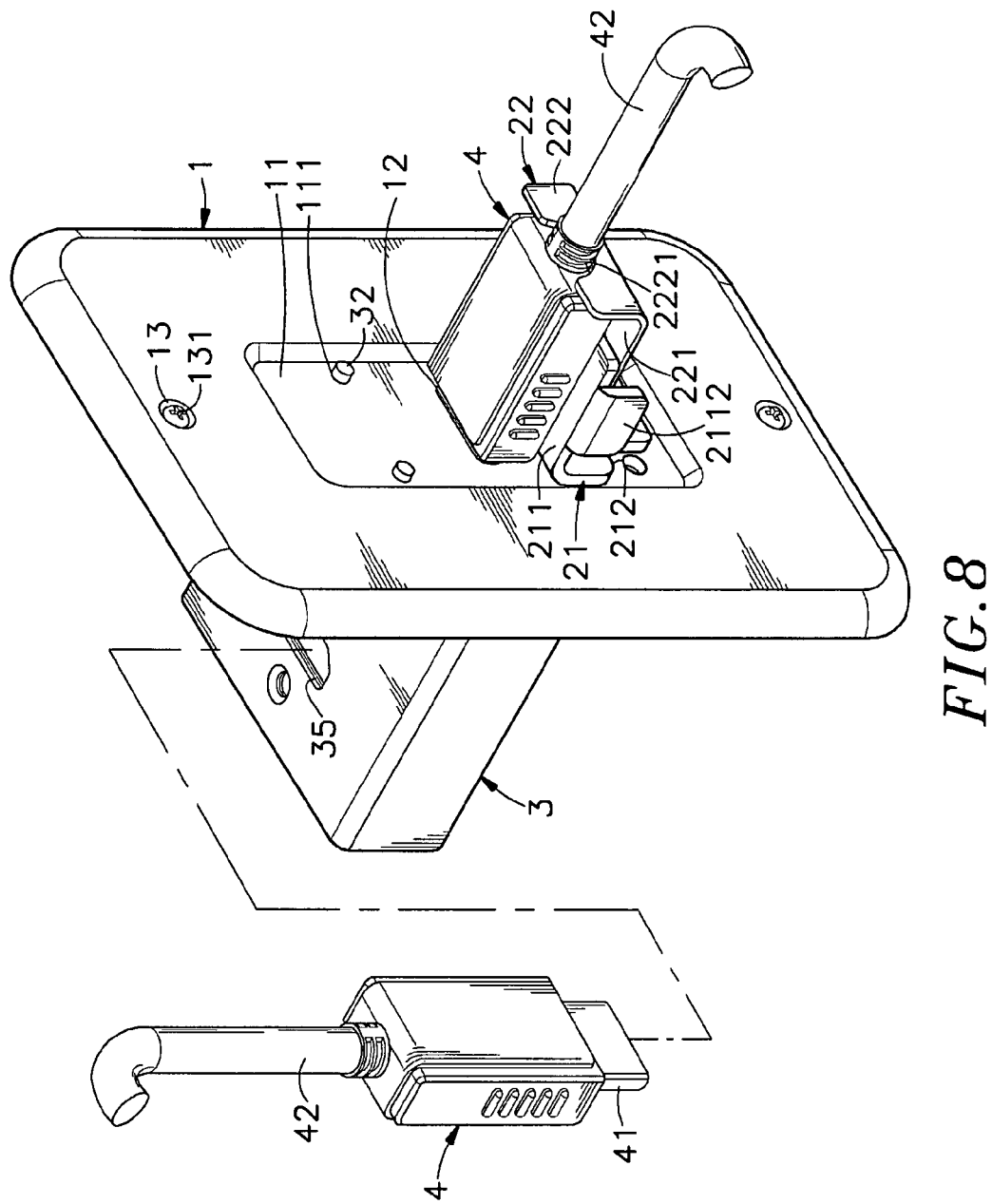
FIG. 8 is a schematic drawing of the present invention, showing connection of the signal amplifier of the wall plate assembly between two HDMI connectors.
Figure 9:
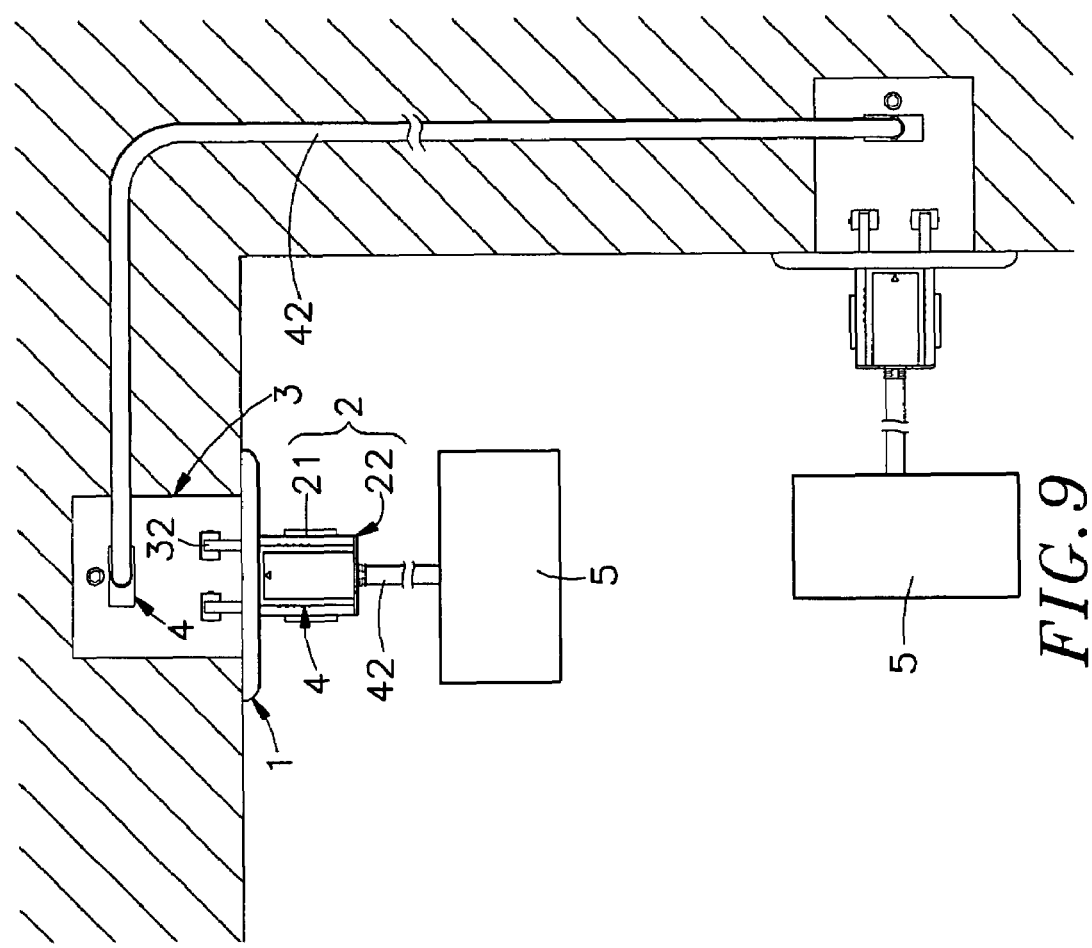
FIG. 9 is a schematic drawing showing an application example of the present invention.

Referring to FIGS. 8 and 9, the screws 131 that are mounted in the mounting holes 13 of the wall plate 1 and the mounting through holes 343 of the mounting plate 34 are fastened to the ceiling, wall or floor to affix the wall plate assembly in place. When two wall plate assemblies are installed in the ceiling, wall or floor at different locations and respectively connected to an electronic device 5 (video monitor, video game console, multimedia player, VCD player, DVD player, projector, set-top box, etc.) through the respective cable 42, another cable 42 is used and installed in the ceiling, wall or floor with the two electric connectors (HDMI connectors) 4 thereof respectively connected to the adapter interfaces 35 of the signal amplifiers 3 of the wall plate assemblies for audio/video signal transmission between the two electronic devices 5. By means of the signal amplifier 3 to amplify the signal, the invention enhances signal gain and eliminates signal attenuation problem during transmission.

Further, the indicator lights 32 of the signal amplifier 3 are respectively inserted into the through holes 111 of the wall plate 1. After connection of one electric connector (HDMI connector) 4 to the connection interface 31 of the signal amplifier 3, the indicator lights 32 indicate the operation status. In case of operation failure or circuit damage, the indicator lights 32 give an indication so that a repair or replacement work can be quickly done.

The above-described embodiment is simple one example of the present invention, and not as a limitation. The signal amplifier 3 that is provided at one side of the wall plate 1 is provided with a power connector 333 for receiving an external power plug to provide the signal amplifier 3 with the necessary working voltage so that the signal amplifier 3 effectively enhances the signal strength, improving signal transmission quality.

As stated above, the invention provides a wall plate assembly, which has the following features:

1. The signal amplifier 3 is provided with a power connector 333 for receiving an external power plug to provide the signal amplifier 3 with the necessary working voltage so that the signal amplifier 3 effectively enhances the signal strength, eliminating the problem of signal attenuation during transmission.

2. The signal amplifier 3 is provided with at least one indicator light 32, which gives an indication when power low during transmission of a signal through the connection interface 31 and the adapter interface 35. At this time, an external power plug can be connected to the power connector 333 to provide the signal amplifier 3 with the necessary working voltage.

In general, the invention provides a wall plate assembly, which comprises a wall plate for receiving an electric connector, a support device coupled to the wall plate and horizontally or vertically adjustable to fit the size of the installed electric connector so as to hold down the installed electric connector firmly in position, a signal amplifier, which receives the installed electric connector and amplifies the signal transmitting through the electric connector to enhance signal gain and to eliminate signal attenuation problem, and a power connector for receiving an external power plug to provide the signal amplifier with the necessary working voltage.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wall plate assembly comprising:

a wall plate, said wall plate comprising a front recess for receiving, an insertion slot cut through said front recess for the insertion of a HDMI (High-Definition Multimedia Interface) connector of a HDMI (High-Definition Multimedia Interface) cable, and a power plug hole cut through said front recess for the insertion of a power plug;

a support device fastened to said wall plate below said insertion slot for supporting said HDMI connector to be inserted into said insertion slot;

a signal amplifier fastened to a back side of said wall plate corresponding to said insertion slot, said signal amplifier comprising a circuit board and adapted to enhance signal strength of the signal transmitting through said HDMI connector that is supported on said support device and inserted into said insertion slot; and a power connector aimed at said power plug hole and electrically connected to said signal amplifier for receiving an external power plug to provide said signal amplifier with the necessary working voltage.

2. The wall plate assembly as claimed in claim 1, wherein said wall plate comprises a plurality of mounting holes for the mounting of a respective screw to affix said wall plate to a part of a building.

3. The wall plate assembly as claimed in claim 1, wherein said wall plate has at least one through holes above said insertion slot; said signal amplifier comprises at least one indicator light respectively inserted into said at least one through holes of said wall plate.

4. The wall plate assembly as claimed in claim 1, wherein said signal amplifier comprises a connection interface aimed at said insertion slot for receiving said HDMI connector, and an adapter interface electrically connected to said connection interface for signal output.

5. The wall plate assembly as claimed in claim 4, wherein said connection interface and said adapter interface of said signal amplifier are female HDMI (High-Definition Multimedia Interface) connectors.

6. The wall plate assembly as claimed in claim 4, wherein said connection interface and said adapter interface of said signal amplifier are male HDMI (High-Definition Multimedia Interface) connectors.

7. The wall plate assembly as claimed in claim 1, wherein said support device comprises a first support frame vertically adjustably fastened to said front recess of said wall plate below the elevation of said insertion slot, said first support frame having a vertical sliding slot, a first lock screw inserted through said vertical sliding slot and fastened to said front recess of said wall plate to adjustably lock said first support frame to said wall plate, a second support frame horizontally adjustably coupled to said first support frame, said second support frame having a flat horizontal base, a elongated sliding slot cut through top and bottom sides of said flat horizontal base, and an upright wall perpendicularly upwardly extending from one side of said flat horizontal base, and an arched top notch on a top side of said upright wall for supporting said HDMI cable of said HDMI connector, and a second lock screw inserted through said elongated sliding slot and fastened to said first support frame to adjustably lock said second support frame to said first support frame.

\* \* \* \* \*